United States Patent
Balboni et al.

(10) Patent No.: US 7,427,195 B2
(45) Date of Patent: Sep. 23, 2008

(54) DEVICE FOR SEPARATING AND TRANSPORTING A SIZED PORTION OF MATERIAL IN A PLANT FOR FORMING ARTICLES BY COMPRESSION MOULDING

(75) Inventors: Alessandro Balboni, Granarolo Dell'Emilia (IT); Maurizio Borgatti, Imola (IT); Fiorenzo Parrinello, Medicina (IT)

(73) Assignee: Sacmi-Cooperativa Meccanici Imola Soc. Coop. A.R.L., Imola (IT)

( * ) Notice: Subject to any disclaimer, the term of this patent is extended or adjusted under 35 U.S.C. 154(b) by 162 days.

(21) Appl. No.: 10/752,087

(22) Filed: Jan. 7, 2004

(65) Prior Publication Data

US 2004/0212128 A1  Oct. 28, 2004

(30) Foreign Application Priority Data

Jan. 31, 2003  (IT) ........................... RE2003A0012

(51) Int. Cl.
 *B28B 3/06* (2006.01)
(52) U.S. Cl. ...................... 425/345; 425/344; 425/297; 425/261; 425/348 R; 425/809
(58) Field of Classification Search ................ 425/344, 425/345, 311, 312, 307, 313, 804, 813, 296, 425/297, 348 R, 809
See application file for complete search history.

(56) References Cited

U.S. PATENT DOCUMENTS

| | | | | |
|---|---|---|---|---|
| 3,782,329 A | * | 1/1974 | Everett | 118/215 |
| 3,827,843 A | * | 8/1974 | Blouch | 425/127 |
| 3,955,605 A | | 5/1976 | Zupan | |
| 4,277,431 A | | 7/1981 | Peller | |
| 4,287,847 A | * | 9/1981 | Ohmi | 118/215 |
| 4,640,673 A | | 2/1987 | Takeda et al. | |
| 4,995,803 A | * | 2/1991 | Champalaune et al. | 425/190 |
| 5,118,273 A | * | 6/1992 | Murayama et al. | 425/126.1 |
| 5,370,519 A | | 12/1994 | Shapcott | |
| 5,456,587 A | * | 10/1995 | Ingram | 425/168 |
| 5,807,592 A | * | 9/1998 | Alieri | 425/347 |
| 6,227,836 B1 | * | 5/2001 | Kato et al. | 425/89 |
| 6,368,094 B1 | * | 4/2002 | Dennis et al. | 425/144 |
| 6,619,946 B1 | * | 9/2003 | Marshall et al. | 425/305.1 |
| 2006/0034960 A1 | * | 2/2006 | Pucci et al. | 425/110 |

* cited by examiner

*Primary Examiner*—Yogendra Gupta
*Assistant Examiner*—Maria Veronica D Ewald
(74) *Attorney, Agent, or Firm*—Browdy and Neimark, P.L.L.C.

(57) ABSTRACT

A method for separating a portion of extruded material from the continuous strip leaving an extruder, consisting of passing in front of the extrusion nozzle withdrawal means associated with at least one cutting means; said withdrawal means and said at least one cutting means are made to move independently of each other with velocities, in the sense of vectors, which differ from each other and differ in relation to the material portion separated.

34 Claims, 2 Drawing Sheets

DEVICE FOR SEPARATING AND TRANSPORTING A SIZED PORTION OF MATERIAL IN A PLANT FOR FORMING ARTICLES BY COMPRESSION MOULDING

TECHNICAL FIELD

The present patent relates generally to plants for forming articles by the known compression moulding method, and in particular relates to the feeding of sized portions of material into the cavity of the forming mould.

BACKGROUND ART

The sized portions to be fed to the cavity of the forming mould are generally obtained by separation from a strip of extruded material. The strip can have a circular or approximately circular cross-section, which can be full or annular.

To correctly form the article within the compression forming mould the geometrical shape of the sized portion separated from the strip must be regular and free of surface defects.

The separation of the sized portion from the strip hence represents an operation of essential importance.

It should be noted that the sized portion separated form the strip is ductile and sometimes sticky, this fact enabling the ensuing description to be better understood.

It should also be noted that the means for separating and withdrawing the sized portion are generally positioned in the known art on a turntable which rotates adjacent to the extrusion nozzle, which is fixed and can be positioned below or above the separation and withdrawal means.

In both cases the withdrawal means consist of a U-shaped element with its arms slightly diverging, associated with pneumatic means for retaining the sized portion or for releasing it where required, the element presenting its mouth facing forward with reference to the direction of rotation of the turntable on which it is arranged.

More precisely the mouth is positioned "upstream", the terms "upstream" and "downstream" relating hereinafter to the direction of rotation of the turntable.

Said means are known as the hand-like withdrawal element or simply hand-like element, and will be known as such hereinafter.

The known art comprises means for cutting and separating the sized portion associated with the extrusion nozzle, and arranged to collaborate with the hand-like element.

According to the known art, said separation or cutting means are positioned downstream of the hand-like element, and are rigid therewith. Systems are also known consisting of a sort of spring cutter in which the element which cuts off the sized portion simultaneously propels the plastic material into the mould.

The known solutions suffer from a series of drawbacks deriving from the fact that the action of the hand-like element causes deformation or inaccuracy in the sized portion which negatively influences the quality of the moulded article.

The velocity with which the material strip is cut through depends on the machine productivity and hence cannot be adjusted to the desired optimum velocity for separating the sized portion from the strip.

In the known art, the sized portions separated from the strip first come into contact with the hand-like element, which pushes them tangentially forward relative to the extrusion nozzle, and then come into contact with the cutting means consisting of a cutting blade which shaves the material on the extrusion nozzle only in that part of the sized portion which when separated is distant from the extrusion nozzle.

That portion of the sized portion cut off may also appear torn because if the cutting velocity is not suitable, elastic viscose movements predominate within the molten material which lead to tearing instead of cutting of the material in the separation area.

That portion of the sized portion which is the last to abandon the extrusion nozzle is therefore never subjected to correct cutting action, either because the cutting means act when said portion has already been separated from the strip, or because they act at an inconvenient velocity. Said upper portion therefore presents a surface with traces of the tearing action due to the passage of the hand-like element in contact with the extrusion nozzle.

DISCLOSURE OF THE INVENTION

The object of the present invention is to eliminate the aforestated drawbacks by means of a simple, reliable and economical solution. Said object is attained according to the invention by the characteristics defined in the claims.

Essentially, according to the invention the cutting means are operated separately from the withdrawal means, which move relative to the extrusion nozzle with a velocity, in the sense of a vector, which is different from the velocity with which the hand-like element moves, the velocity with which the strip is cut to form the sized portion hence being independent of the machine productivity.

Said cutting means can be mechanical, hydraulic or thermal.

They can consists of a high velocity fluid jet or a laser beam.

In the case of hydraulic or mechanical cutting means, according to the invention the cutting means have a temperature which is less than the temperature of the material to be treated by an amount sufficient to cause a localized viscosity increase of the material within the zone of or immediately close to the cut, without this negatively influencing the temperature, and hence the plasticity, of the remaining part of the sized portion.

The cutting means of the invention are hence preferably, but not necessarily, cooled by external means.

Said cooling means can conveniently consist of a cooling liquid circuit provided within the body of the cutting means and connected by rotary joints to the non-rotating fixed parts of the machine.

The temperature difference between the cutting means and the material to be treated depends on various factors, such as the mass of the cutting means, their velocity relative to the material to be treated, and the plasticity and viscosity characteristics of this latter.

A convenient temperature difference between the temperature of the material to be treated and the cutting means is at least 5° C., preferably more than 20° C. and possibly at least 50° C. depending on the material to be treated.

In its simplest version, the cutting means consist of a rectilinear uncooled blade, but the blade can in reality have any shape, and could also comprise cooling means.

The cutting means can precede or follow the passage of the hand-like element, depending on their type. The invention provides various embodiments, one of which is described hereinafter by way of non-limiting example.

Said embodiment comprises an uncooled rectilinear blade, it being evidently also able to comprise blades of different form, such as cooled blades.

The cutting means are conveniently but not necessarily positioned flush with the extrusion nozzle; depending on the velocity of the cutting means or their type, these latter can also be spaced from the extrusion nozzle. The means for withdrawing and transferring the sized portion from the extrusion nozzle, commonly known as hand-like elements, are generally positioned circumferentially equidistant on a first auxiliary turntable rotating synchronously with the main turntable.

Sometimes the cutting means are positioned circumferentially on a second auxiliary turntable, equidistant from each other and from the axis of rotation of the turntable.

Each cutting means can be fixed relative to the auxiliary turntable, or rotate about its own axis in such a manner as to be subjected to a planetary movement about its own axis, which itself rotates about the axis of the auxiliary turntable. This arrangement facilitates the ability to give the cutting means the desired velocity.

The two circumferences on which the cutting means and the hand-like elements are respectively aligned are mutually tangential at a point which coincides with the axis of the extrusion nozzle.

The extrusion nozzle can face downwards or upwards, in a generally vertical direction, the cutting means always being positioned between the extrusion nozzle and the hand-like elements.

If the extrusion nozzle faces downwards, the hand-like elements must be open both downwards and upwards, and a third auxiliary turntable can be provided to facilitate passage of the sized portion from the first withdrawal and transfer turntable to the mould cavity.

In the most simple embodiment, the axes of the first and second turntable are coaxial and the directions of rotation of the turntables are the same, but it will be apparent that the directions of rotation of the turntables can also be opposite, and that the axes of rotation of the two turntables can be positioned either on the same side or on opposite sides of the extrusion nozzle.

The sized portion separated from the strip remains in the hand-like element which collects it either by spontaneous adhesion if exhibiting cohesion, or by the action of pneumatic suction means, or by mechanical retention by the known die swell phenomenon, or by swelling of the sized portion downstream of the extrusion nozzle.

Any pneumatic means are hence associated either with the hand-like elements of the first auxiliary withdrawal and transport turntable, or with the hand-like elements of the possible third auxiliary turntable, to retain the portions by suction and to blow the portions, where necessary, into the mould cavity.

The pneumatic circuits are generally associated with the respective turntables.

The operational and constructional characteristics of the invention will be apparent from the ensuing detailed description of a particular embodiment thereof given with reference to the figures of the accompanying drawings.

Figure 1:
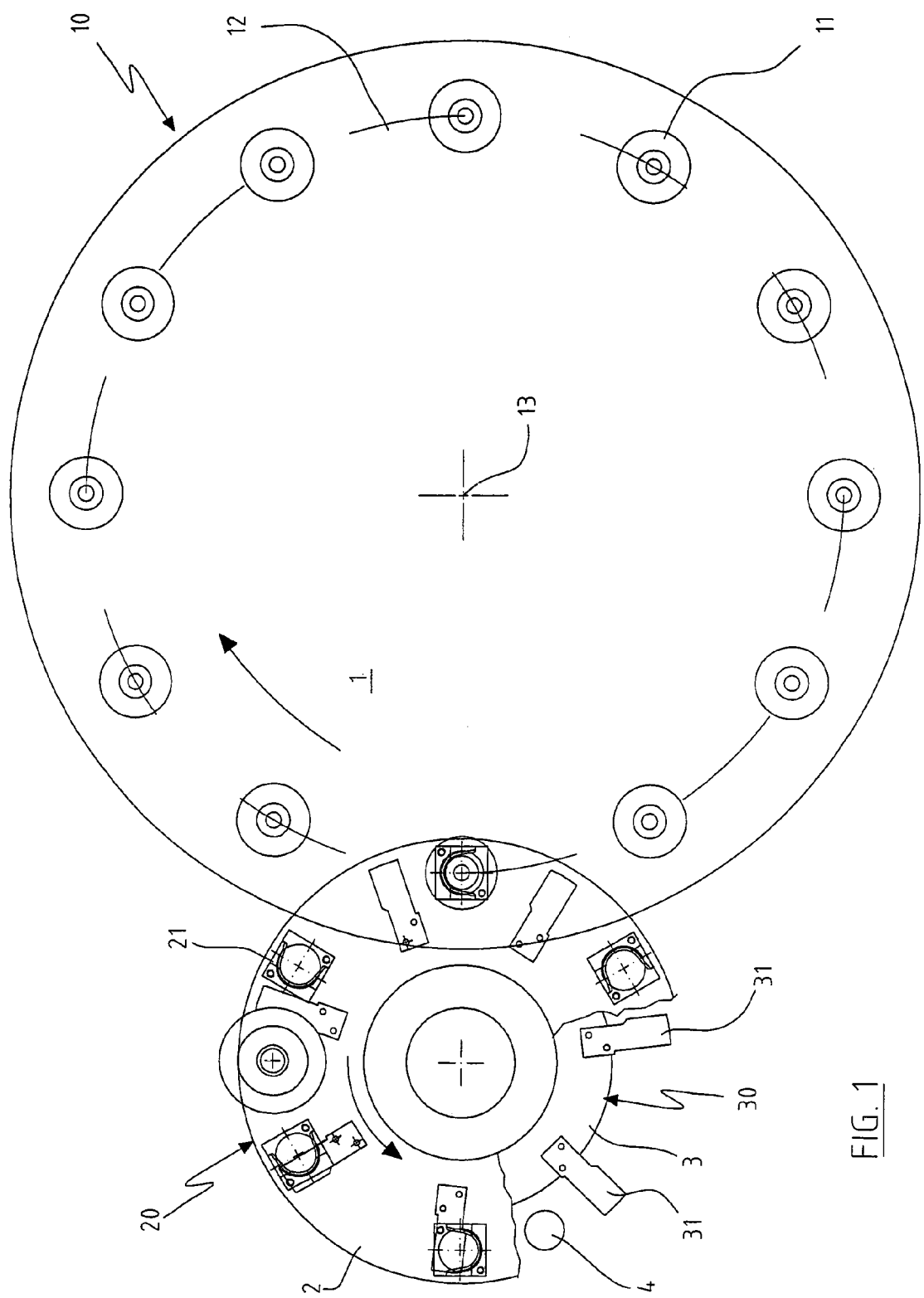
FIG. 1 is a schematic plan view of a machine for compression moulding caps, according to the invention.
Figure 2:
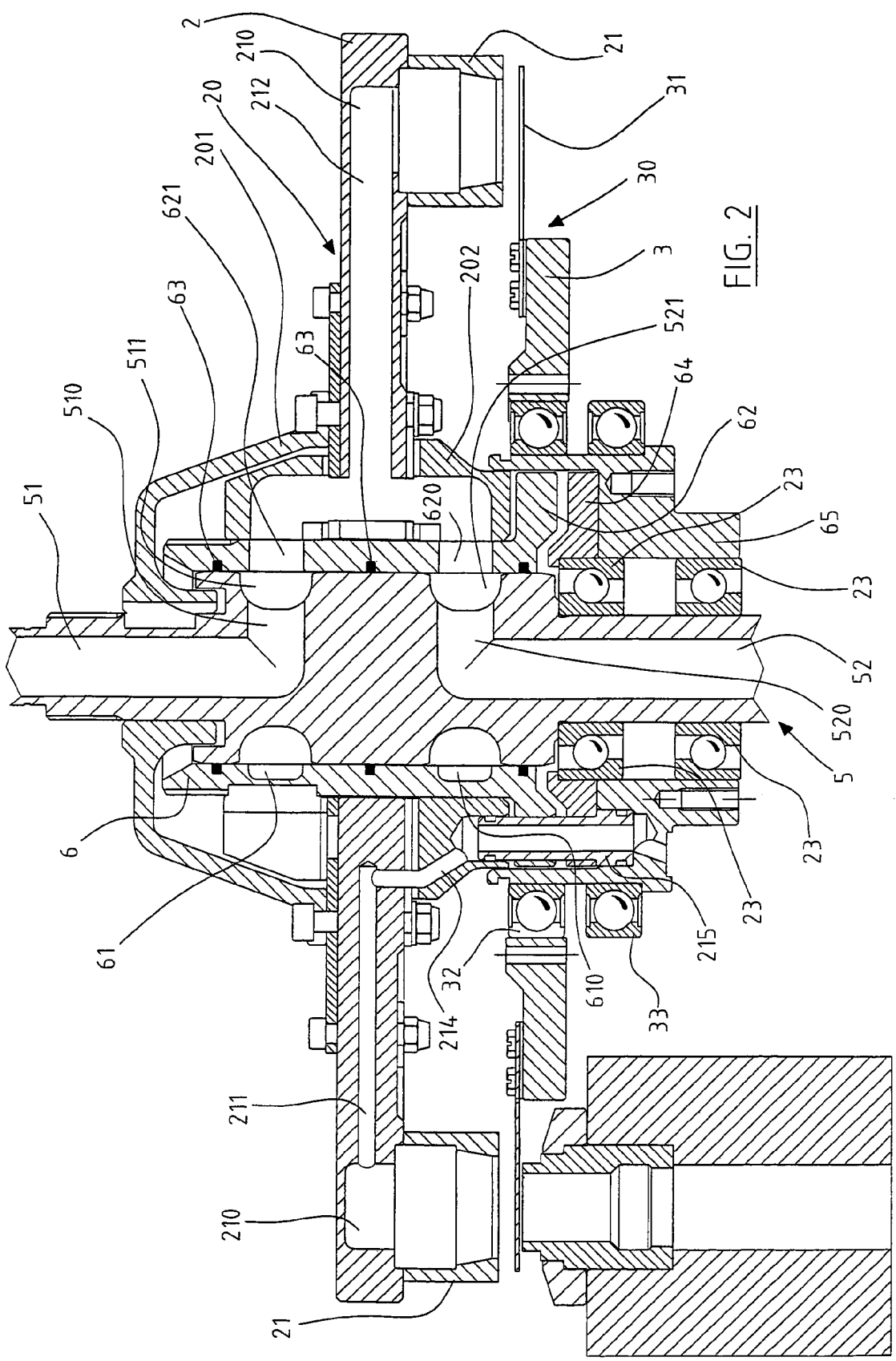
FIG. 2 is a detail thereof on an enlarged scale shown with parts partially sectioned.

FIGS. 1 and 2 show the platform 1 of a turntable 10, seen schematically from above, which carries a number of moulding dies 11 intended to collaborate with a like number of punches, not shown.

The dies 11 are distributed equidistantly on a circumference 12 of the platform 1 coaxial to the axis 13 of rotation of the platform 1.

To the side of the turntable 10 there is positioned the platform 2 of a first auxiliary turntable 20 for withdrawing the sized portion, and comprising a number (m) of U-shaped hand-like elements 21 with their concavity facing in the direction of rotation of the turntable 20.

Coaxial to and below the platform 2 there is positioned the platform 3 of a second auxiliary turntable 30 carrying the cutting means, on the periphery of which there are equidistantly distributed a number (n) of blades 31. The turntables 20 and 30 rotate in the same direction.

The number (n) of blades 31 is greater than the number of hand-like elements 21 by at least one, i.e. at least equal to (m+1).

Below the blades 31, and flush therewith, there is positioned the extrusion nozzle 4 of an extruder from which the strip of extruded material emerges. The ratio of the velocity of the platform 2 to the velocity of the platform 3 is equal to the ratio (m):(n), which is generally equal to (m):(m+1).

By virtue of the velocity difference between the platforms 2 and 3, and the fact that the number of hand-like elements is less than the number of blades by one, each blade follows a hand-like element until, during one revolution of the platform 2, it becomes located exactly below it, whereas during the next revolution if follows the hand-like element which precedes it in the direction of rotation.

The point at which the blades lie exactly below the hand-like elements is always the same and corresponds to the axis of the underlying nozzle 4 of the extruder.

FIG. 2 is a section through the turntables 2 and 3, taken on two different radial planes.

A fixed central structure 5, rigid with the machine bed, not shown, presents two axial channels 51 and 52 which do not mutually communicate, but terminate at their close-together ends with two radial channels 510 and 520 communicating with two circumferential channels 511 and 521, and are connected at their opposite ends to a suction environment.

On the outside of the structure 5 there is mounted a bush 6 provided with a base flange 62 and two circumferential channels 61 and 610 positioned in front of the channels 511 and 521 of the structure 5. Two through holes 621 and 620 provided in the wall of the bush 6 connect the channels 61 and 610 to the outside.

Gasket rings 63 seal the interior of said channels.

The lower part of the structure 5 supports via the bearings 23 the turntable 20, which can rotate driven by means not shown, and comprises the platform 2.

In greater detail, the platform 2 is clamped between an upper body 201 and a lower body 202; the lower body 202 is fixed, by means not shown, to the flange 62 of the bush 6 which itself is fixed to a plate 64 engaging the upper bearing 23; the plate 64 is fixed to a lower bush 65 of differential cross-sections which receives the body 202, the flange 62 and the plate 64 in that order starting from the top.

The plate 2 peripherally carries six equidistant hand-like elements 21, each of which communicates with an upper cavity 210 into which two separate channels 211 and 212 extend.

The channel 211 connects each hand-like element to a compressed air feed and is prolonged sideways and downwards to below the widened section of the bush 65 via channels 214 provided in the body 202, a hole in the flange 62 and a corresponding hole in the bush 65; a small bush 215 with seal gaskets is positioned in the corresponding holes of the body 202, the flange 62 and the bush 65.

To each of the cavities 210 (it should be noted that as stated the left side of FIG. 2 is a section on a slightly different plane than the plane on which the section of the right side is taken) there also arrives a channel 212 positioned to the side of the channel 211; in proximity to the centre of the plate 2 the channel 212 branches into two branches which open in front of the channels 61, 510 and 610, 521 respectively, via the respective holes 621 and 521 provided in the bush 6.

External to the bush 65 the bearing 32 rotatably supports the plate 3 of the turntable 30, on which seven equidistant blades 31 are distributed.

The bearing 33 rotatably supports the bush 65 in a manner not shown.

The cutting part of the blade is orientated in the direction of rotation of the plate 3, which rotates in the same direction as the plate 2, but at different velocity. In the illustrated example, the velocity of the plate 3 is equal to seven sixths of the velocity of the plate 2.

The means which rotate the two plates are not shown in detail as they are of usual type, comprising an upper pulley fixed to the plate 3 and a lower pulley fixed to the bush 65, they being of suitably different diameters and connected by two separate drive belts to a single drive pulley connected synchronously to the means which rotate the turntable 1.

The operation of the invention will now be described with the aid of the figures.

The strip from which the sized portions are to be separated leaves continuously from the extrusion nozzle at a controlled velocity such as to obtain separation of portions of the desired size.

The hand-like elements carried by the first auxiliary turntable pass below the extrusion nozzle at a distance therefrom such as to enable the blades of the second auxiliary turntable to pass.

The velocity of the first auxiliary turntable and the velocity of the main turntable carrying the moulds are synchronized such that a hand-like element always lies over the cavity of a mould at the point of tangency of the circumferences of the two turntables carrying the hand-like elements and moulds respectively.

In the illustrated example the second auxiliary turntable carrying the blades is coaxial to the first auxiliary turntable and rotates in the same direction thereas.

As stated, the velocity of the second auxiliary turntable is regulated relative to the velocity of the first auxiliary turntable in ratio to the number of blades and hand-like elements, such that a hand-like element and a blade pass simultaneously under the extrusion nozzle at different velocities.

Although an example has been described in which the first and second turntable are coaxial and rotate in the same direction, said turntables can be non-coaxial and rotate in opposite directions, regulating their velocities such that passage of the blades below the extrusion nozzle is always simultaneous with the presence of a hand-like element, and that each hand-like element always passes over the mould cavity without a blade therebetween.

The sized portion collected by each hand-like element is then released into the mould cavity carried by the main turntable by virtue of an air jet which can flow from a conduit present in the said first auxiliary turntable, as in the illustrated example, or from a conduit present in a possible third auxiliary turntable.

This latter is the case if the extrusion nozzle faces upwards.

The invention claimed is:

1. Apparatus for separating a portion of extruded material from a continuous strip leaving an extruder, comprising:
   an extrusion nozzle;
   at least one cutting member rotatable by a support in front of said extrusion nozzle for severing said portion therefrom;
   a forming mould having a mould cavity for compression moulding said portion;
   a turntable rotating a withdrawal device so that said withdrawal device receives said portion and releases said portion into said mould cavity, said at least one cutting member being distinct from said withdrawal device and interposed between said extrusion nozzle and said withdrawal device, said support being separate from said turntable;
   a driving system for rotating said turntable and said support at respective velocities which differ from each other.

2. Apparatus according to claim 1, wherein said driving system is such as to drive said turntable and said support independently of each other.

3. Apparatus according to claim 1, wherein said at least one cutting member is chosen in a group comprising mechanical, hydraulic and thermal device.

4. Apparatus according to claim 1, and further comprising a cooling circuit provided within said at least one cutting member.

5. Apparatus according to claim 1, wherein said at least one cutting member comprises a blade.

6. Apparatus according to claim 5, wherein said blade is a rectilinear blade.

7. Apparatus according to claim 1, wherein said at least one cutting member comprises a fluid jet.

8. Apparatus according to claim 1, wherein said at least one cutting member comprises a laser beam.

9. Apparatus according to claim 1, wherein said withdrawal device comprises a concavity having a U-shaped section open in the direction of movement and an axis parallel to said extrusion nozzle.

10. Apparatus according to claim 1, and further comprising a second turntable supporting said at least one cutting member.

11. Apparatus according to claim 10, wherein said turntable and said second turntable rotate in the same direction.

12. Apparatus according to claim 10, wherein said turntable and said second turntable rotate in opposite directions.

13. Apparatus according to claim 10, wherein said turntable and said second turntable are coaxially disposed.

14. Apparatus according to claim 10, wherein said turntable and said second turntable rotate about different axes.

15. Apparatus according to claim 10, wherein blades of said at least one cutting member are fixed to said second turntable and rotate about their own axes so as to undergo a planetary movement.

16. Apparatus according to claim 9, wherein said extrusion nozzle is oriented upwards, said concavity being closed upwards and open downwards.

17. Apparatus according to claim 9, wherein said extrusion nozzle is oriented downwards, said concavity being open upwards and downwards.

18. Apparatus for separating a portion of extruded material from a continuous strip leaving an extruder, comprising an extrusion nozzle, a withdrawal device associated with at least one cutting member movable in front of said extrusion nozzle, a mould cavity for receiving said portion from said withdrawal device, said at least one cutting member being distinct from said withdrawal device, said at least one cutting member having a body substantially contained in a cutting plane and a cutting edge movable in said cutting plane during cutting, so that said portion is severed from said continuous strip along said cutting plane, wherein a driving system is provided for rotating said withdrawal device and said at least one cutting member at respective velocities which differ from each other.

19. Apparatus according to claim 18, wherein said driving system is such as to drive said withdrawal device and said at least one cutting member independently of each other.

20. Apparatus according to claim 18, wherein said at least one cutting member is chosen in a group comprising mechanical, hydraulic and thermal device.

21. Apparatus according to claim 18, and further comprising a cooling circuit provided within said at least one cutting member.

22. Apparatus according to claim 18, wherein said at least one cutting member comprises a blade.

23. Apparatus according to claim 22, wherein said blade is a rectilinear blade.

24. Apparatus according to claim 18, wherein said at least one cutting member comprises a fluid jet.

25. Apparatus according to claim 18, wherein said at least one cutting member comprises a laser beam.

26. Apparatus according to claim 18, wherein said withdrawal device comprises a concavity having a U-shaped section open in the direction of movement and an axis parallel to said extrusion nozzle.

27. Apparatus according to claim 18, and further comprising a first turntable supporting said withdrawal device and a second turntable supporting said at least one cutting member.

28. Apparatus according to claim 27, wherein said first turntable and said second turntable rotate in the same direction.

29. Apparatus according to claim 27, wherein said first turntable and said second turntable rotate in opposite directions.

30. Apparatus according to claim 27, wherein said first turntable and said second turntable are coaxially disposed.

31. Apparatus according to claim 27, wherein said first turntable and said second turntable rotate about different axes.

32. Apparatus according to claim 27, wherein blades of said at least one cutting member are fixed to said second turntable and rotate about their own axes so as to undergo a planetary movement.

33. Apparatus according to claim 26, wherein said extrusion nozzle is oriented upwards, said concavity being closed upwards and open downwards.

34. Apparatus according to claim 26, wherein said extrusion nozzle is oriented downwards, said concavity being open upwards and downwards.

* * * * *